United States Patent
Hanai et al.

(10) Patent No.: US 10,960,404 B2
(45) Date of Patent: Mar. 30, 2021

(54) DRAINAGE PROCESSING APPARATUS AND DRAINAGE PROCESSING METHOD

(71) Applicants: FUJI ELECTRIC CO., LTD., Kanagawa (JP); UTSUNOMIYA UNIVERSITY, Tochigi (JP)

(72) Inventors: Yosuke Hanai, Setagaya-ku (JP); Yasuzo Sakai, Utsunomiya (JP)

(73) Assignees: FUJI ELECTRIC CO., LTD., Kanagawa (JP); UTSUNOMIYA UNIVERSITY, Tochigi (JP)

(*) Notice: Subject to any disclaimer, the term of this patent is extended or adjusted under 35 U.S.C. 154(b) by 65 days.

(21) Appl. No.: 16/021,028

(22) Filed: Jun. 28, 2018

(65) Prior Publication Data
US 2018/0311680 A1 Nov. 1, 2018

Related U.S. Application Data

(63) Continuation of application No. PCT/JP2017/008252, filed on Mar. 2, 2017.

(30) Foreign Application Priority Data

Mar. 8, 2016 (JP) ............................. JP2016-044466

(51) Int. Cl.
*B03C 1/12* (2006.01)
*B03C 1/28* (2006.01)
(Continued)

(52) U.S. Cl.
CPC ............... *B03C 1/12* (2013.01); *B03C 1/032* (2013.01); *B03C 1/035* (2013.01); *B03C 1/0332* (2013.01);
(Continued)

(58) Field of Classification Search
CPC ....... B03C 1/032; B03C 1/0332; B03C 1/035; B03C 1/12; B03C 1/28; B03C 1/284;
(Continued)

(56) References Cited

U.S. PATENT DOCUMENTS

| 6,077,333 A * | 6/2000 | Wolfs ...................... B03C 1/288 96/1 |
| 6,099,738 A | 8/2000 | Wechsler |
| 2017/0267555 A1 | 9/2017 | Hanai |

FOREIGN PATENT DOCUMENTS

| CA | 2825752 A1 | 8/2012 |
| CN | 1468812 A | 1/2004 |
(Continued)

OTHER PUBLICATIONS

International Search Report for International Patent Application No. PCT/JP2017/008252, issued by the Japan Patent Office dated May 9, 2017.
(Continued)

*Primary Examiner* — Dirk R Bass

(57) ABSTRACT

A drainage processing apparatus that processes drainage expelled from a scrubber apparatus is provided. The drainage processing apparatus includes: a magnetic powder adding unit that adds magnetic powders to the drainage; a transfer unit that transfers the drainage; and an adsorbing unit that: is provided in the transfer unit; adsorbs bound matter that is contained in the drainage and contains at least a process-target substance and the magnetic powders; and retains the bound matter in the transfer unit. In one example, the adsorbing unit is able to re-release adsorbed bound matter into the transfer unit. In one example, the adsorbing unit has a permanent magnet provided to be directly insertable into and removable from within the transfer unit, and the permanent magnet adsorbs the bound matter by being
(Continued)

inserted into the transfer unit, and re-releases the bound matter into the transfer unit by being removed from within the transfer unit.

17 Claims, 15 Drawing Sheets

(51) Int. Cl.
  *B03C 1/032* (2006.01)
  *B03C 1/035* (2006.01)
  *B03C 1/033* (2006.01)
  *C02F 1/52* (2006.01)
  *C02F 1/00* (2006.01)
  *B03C 1/30* (2006.01)

(52) U.S. Cl.
  CPC ............... *B03C 1/28* (2013.01); *B03C 1/284* (2013.01); *B03C 1/286* (2013.01); *B03C 1/288* (2013.01); *B03C 1/30* (2013.01); *C02F 1/00* (2013.01); *C02F 1/52* (2013.01); *B03C 2201/18* (2013.01); *B03C 2201/24* (2013.01); *B03C 2201/28* (2013.01); *B03C 2201/30* (2013.01)

(58) Field of Classification Search
  CPC  B03C 1/286; B03C 1/288; B03C 1/30; B03C 2201/18; B03C 2201/24; B03C 2201/28; B03C 2201/30; C02F 1/00; C02F 1/52
  See application file for complete search history.

(56) References Cited

FOREIGN PATENT DOCUMENTS

| | | | |
|---|---|---|---|
| DE | 202014100826 | U1 | 7/2014 |
| DE | 102014107281 | A1 | 8/2015 |
| EP | 3269687 | A1 | 1/2018 |
| JP | H0957149 | A | 3/1997 |
| JP | H11165180 | A | 6/1999 |
| JP | 2001129596 | A | 5/2001 |
| JP | 2004081933 | A | 3/2004 |
| JP | 2006341212 | A | 12/2006 |
| JP | 2008110285 | A | 5/2008 |
| JP | 2010269248 | A | 12/2010 |
| JP | 2014018751 | A | 2/2014 |
| WO | 2015137300 | A1 | 9/2015 |

OTHER PUBLICATIONS

Extended European Search Report issued for counterpart European Application No. 17763061.3, issued by the European Patent Office dated Dec. 18, 2018.

Office Action issued for counterpart Chinese Application 201780005381.4, issued by the China National Intellectual Property Administration dated Sep. 17, 2020.

* cited by examiner

DRAINAGE PROCESSING APPARATUS AND DRAINAGE PROCESSING METHOD

The contents of the following Japanese patent application(s) are incorporated herein by reference:
NO. 2016-044466 filed on Mar. 8, 2016,
NO. PCT/JP2017/008252 filed on Mar. 2, 2017.

BACKGROUND

1. Technical Field

The present invention relates to a drainage processing apparatus and a drainage processing method.

2. Related Art

Scrubber apparatuses that remove suspended solids such as black carbon contained in exhaust gas from engines of marine vessels and the like have been known. In a scrubber apparatus, suspended solids in exhaust gas are captured by scrubber water and expelled. Drainage of the scrubber apparatus is, after being subjected to a process of removing suspended solids or the like, fed back to the scrubber apparatus or released to the outside. Known methods of removing suspended solids contained in drainage of scrubber apparatuses include methods such as centrifugation, membrane filtration or coagulating sedimentation (please see Patent Documents 1 to 3, for example).

[Patent Document 1] Japanese Patent Application Publication No. 2004-81933
[Patent Document 2] Japanese Patent Application Publication No. H11-165180
[Patent Document 3] Japanese Patent Application Publication No. 2001-129596

A removal method using centrifugation requires large power consumption by an apparatus. Also, a removal method using membrane filtration consumes time and labor for maintenance such as membrane replacement necessitated by clogging of membranes. Also, coagulating sedimentation requires a long time for sedimentation.

[General Disclosure]

According to a first aspect, a drainage processing apparatus that processes drainage expelled from a scrubber apparatus is provided. The drainage processing apparatus may include a magnetic powder adding unit that adds magnetic powders to the drainage. The drainage processing apparatus may include a transfer unit that transfers the drainage. The drainage processing apparatus may include an adsorbing unit that: is provided in the transfer unit; adsorbs bound matter that is contained in the drainage and contains at least a process-target substance and the magnetic powders; and retains the bound matter in the transfer unit.

The adsorbing unit may be able to re-release the adsorbed bound matter into the transfer unit. The adsorbing unit may have a permanent magnet provided to be directly insertable into and removable from within the transfer unit The permanent magnet may adsorb the bound matter by being inserted into the transfer unit, and re-releases the bound matter into the transfer unit by being removed from within the transfer unit.

The adsorbing unit may have a permanent magnet. A tube wall of the transfer unit may have a depression to and from which the permanent magnet is insertable and removable. By the permanent magnet being inserted into the depression, an inner wall of the depression adsorbs the bound matter, and by the permanent magnet being removed from within the depression, the bound matter may be re-released into the transfer unit.

The permanent magnet may have a bar shape having a longer side. The permanent magnet may be inserted such that a direction of the longer side becomes orthogonal to a direction of extension of the transfer unit.

The adsorbing unit may have: a first permanent magnet; and a second permanent magnet that is provided at a position different from the first permanent magnet in a direction of extension of the transfer unit and is provided to a tube wall opposite to the first permanent magnet.

The adsorbing unit may have a first permanent magnet provided to be directly insertable into and removable from within the transfer unit. The adsorbing unit may have a second permanent magnet provided upstream of the first permanent magnet in the transfer unit. A tube wall of the transfer unit may have a depression to and from which the second permanent magnet is insertable and removable.

The adsorbing unit may have a plurality of permanent magnets. A density of permanent magnets upstream of the transfer unit may be lower than a density of permanent magnets downstream of the transfer unit.

The permanent magnet may have a bar shape having a longer side. The permanent magnet may be inserted such that a direction of the longer side becomes parallel with a direction of extension of the transfer unit.

The transfer unit may have a large diameter part having a diameter larger than diameters of pipes on an upstream side and a downstream side. The large diameter part may include side surfaces on which openings for the pipes on the upstream side and the downstream side are formed. The permanent magnet may be provided to a side surface of the large diameter part.

The drainage processing apparatus may further include a measuring unit that measures: a concentration of the bound matter contained in the drainage flowing in the transfer unit downstream of the adsorbing unit. The measuring unit may measure a flow rate of the drainage. The drainage processing apparatus may further include a control unit that controls an amount of the permanent magnet to be inserted into the transfer unit or the depression, based on a result of measurement at the measuring unit.

If the drainage containing the bound matter is expelled to an outside, the control unit may cause the adsorbing unit to re-release the bound matter such that a concentration of the bound matter measured by the measuring unit is maintained in a tolerated range. If causing the adsorbing unit to re-release the bound matter, the control unit may cause the bound matter to be re-released from the adsorbing unit sequentially, starting from a downstream side thereof.

An inner wall of the transfer unit may be provided with a protruding part to scrape off the bound matter adsorbed to a surface of the permanent magnet, along with removal of the permanent magnet from the transfer unit. An inner wall of the transfer unit may be provided with a valve that blocks up an opening into which the permanent magnet has been inserted, along with removal of the permanent magnet from the transfer unit.

A second aspect provides a drainage processing method of processing drainage expelled from a scrubber apparatus, the drainage processing method including: adding magnetic powders to the drainage; transferring, in a transfer unit, the drainage to which the magnetic powders are added; and adsorbing, in an adsorbing unit provided in the transfer unit, bound matter formed by a process-target substance and the magnetic powders that are contained in the drainage to retain the bound matter in the transfer unit.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
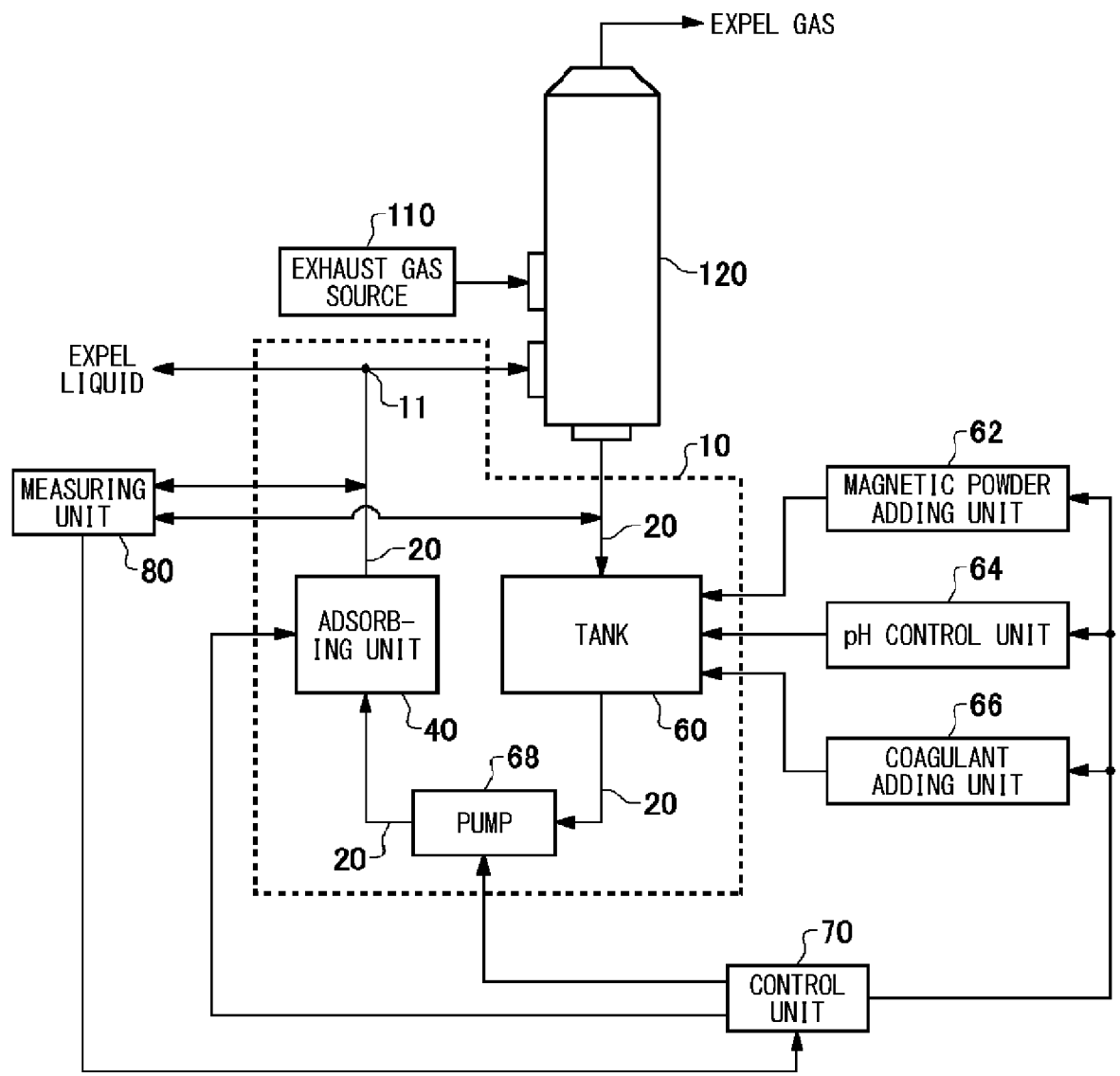
FIG. 1 is a figure showing a drainage processing apparatus 100 according to one embodiment of the present invention together with an exhaust gas source 110 and a scrubber apparatus 120.

FIG. 1 is a figure showing a drainage processing apparatus 100 according to one embodiment of the present invention together with an exhaust gas source 110 and a scrubber apparatus 120. The exhaust gas source 110 is an engine or the like provided to a marine vessel. Exhaust gas expelled by the exhaust gas source 110 contains suspended solids such as black carbon.

The scrubber apparatus 120 is installed in a marine vessel or the like, and processes exhaust gas expelled by the exhaust gas source 110. The scrubber apparatus 120 sprays liquid such as seawater in a tower through which the exhaust gas passes, to capture suspended solids in the exhaust gas into the liquid. The scrubber apparatus 120 expels, to the drainage processing apparatus 100, drainage capturing the suspended solids.

The drainage processing apparatus 100 includes a transfer unit 10, a magnetic powder adding unit 62, a pH control unit 64, a coagulant adding unit 66, a control unit 70 and a measuring unit 80. The transfer unit 10 transfers drainage of the scrubber apparatus 120. The transfer unit 10 may feed the drainage, after being subjected to a predetermined process, back to the scrubber apparatus 120 in order to reuse the drainage in the scrubber apparatus 120 or may expel the drainage having been subjected to a predetermined process out of the marine vessel or the like.

The transfer unit 10 in the present example has a pipe 20, a tank 60, a pump 68 and an adsorbing unit 40. The tank 60 is connected with the scrubber apparatus 120 by the pipe 20. The tank 60 is where drainage of the scrubber apparatus 120 stays, and a predetermined process is performed on the drainage.

The magnetic powder adding unit 62 adds magnetic powders to drainage of the scrubber apparatus 120. The magnetic powder adding unit 62 in the present example feeds magnetic powders to the tank 60. The magnetic powder adding unit 62 may directly feed magnetic powders to the tank 60 or may feed liquid containing magnetic powders to the tank 60. The tank 60 is preferably provided with the stirring function. Thereby, at least part of a process-target substance in drainage and the magnetic powders bind together.

The magnetic powders are formed of a material that can bind with a process-target substance such as black carbon. The magnetic powders may be any of a paramagnet and a ferromagnet. As one example, the magnetic powders are iron oxide such as triiron tetraoxide, cobalt, chromium oxide, ferrite or a mixture of them. The particle size of the magnetic body may be no smaller than 0.05 µm and no larger than 10 µm, or may be no smaller than 0.05 µm and no larger than 5 µm.

The coercive force of the magnetic powders may be no lower than $10^4/4\pi$ A/m and no higher than $4 \times 10^5/4\pi$ A/m, or may be no lower than $2 \times 10^5/4\pi$ A/m and no higher than $3 \times 10^5/4\pi$ A/m. The amount of the magnetic powders added may be no smaller than 0.1 and no larger than 10, or may be no smaller than 0.5 and no larger than 5, in mass ratio to a process-target substance.

If the amount of the magnetic powders added is below the above-mentioned range, efficiency in terms of formation of bound matter containing a process-target substance and the magnetic powders degrades. Examples of the bound matter include magnetic flocs formed by a process-target substance and the magnetic powders being coagulated with a coagulant, but the bound matter is not limited to one containing a coagulant. The bound matter may be any matter as long as it contains at least a process-target substance and the magnetic powders. Also, if the amount of the magnetic powders added is beyond the above-mentioned range, it means that an excessive amount of the magnetic powders is added, and magnetic powders to be wasted increase.

The control unit 70 may control the amount of the magnetic powders that the magnetic powder adding unit 62 feeds to the tank 60, according to the concentration of a process-target substance contained in drainage of the scrubber apparatus 120. The concentration of a process-target substance can be estimated from the turbidity of or concentration of suspended solids (SS) (hereinafter, referred to as the suspended solid concentration) in drainage of the scrubber apparatus 120. The measuring unit 80 may measure the turbidity or suspended solid concentration of drainage of the scrubber apparatus 120. For example, the turbidity of drainage can be measured by a method conforming to JIS K0101, 9.3 or the like. Also, the suspended solid concentration of drainage can be measure by a method conforming to JIS K0102, 14.1 or the like. The control unit 70 may store in advance information indicating the relationship between the turbidity and/or suspended solid concentration of drainage and the amount of magnetic powders to be fed.

The coagulant adding unit 66 adds a coagulant to drainage of the scrubber apparatus 120. The coagulant adding unit 66 in the present example feeds a coagulant to the tank 60. By feeding magnetic powders and a coagulant to the tank 60, magnetic flocs containing the magnetic powders and a process-target substance are formed. Thereby, generation of bound matter formed by the magnetic powders and the process-target substance can be enhanced.

The material of the coagulant, as one example, is polyaluminum chloride, polyferric sulfate, aluminium sulfate, a polymer material or a mixture of them. Examples of polymer materials include, for example, nonionic, cationic, anionic and amphoteric polymer materials. The amount of the coagulant added may be no smaller than 0.005 and no larger than 1, or may be no smaller than 0.01 and no larger than 0.5, per part of a process-target substance.

If the amount of the coagulant added is below the above-mentioned range, efficiency in terms of formation of magnetic flocs degrades. Also, if the amount of the coagulant added is beyond the above-mentioned range, it means that an excessive amount of the coagulant is added, and the amount of the coagulant to be wasted increases.

The control unit 70 may control the amount of the coagulant that the coagulant adding unit 66 feeds to the tank 60, according to the concentration of a process-target substance contained in drainage expelled from the scrubber apparatus 120 per unit time. The measuring unit 80 may measure the turbidity or suspended solid concentration of drainage of the scrubber apparatus 120. A measurement method that can be used is a method conforming to JIS K0101, 9.3 or a method conforming to JIS K0102, 14.1 that is mentioned above, or the like. The control unit 70 may store in advance information indicating the relationship between the turbidity and/or suspended solid concentration of drainage and the amount of the coagulant to be fed.

The pH control unit 64 adjusts the pH of drainage of the scrubber apparatus 120. The pH control unit 64 in the present example feeds pH control chemical to the tank 60. The pH control unit 64 may adjust the pH of drainage such that the pH of the drainage becomes no lower than 4 and no higher than 11. By adjusting the pH of the drainage, alkali consumed by the coagulant can be compensated for.

Drainage to which magnetic powders are added in the tank 60 is transferred to the adsorbing unit 40 through the pipe 20. The pump 68 for sucking up drainage from the tank 60 may be provided between the tank 60 and the adsorbing unit 40.

The adsorbing unit 40 is provided in the transfer unit 10. The adsorbing unit 40 adsorbs bound matter formed by a process-target substance and magnetic powders contained in drainage. The adsorbing unit 40 generates a magnetic field to adsorb the bound matter. The adsorbing unit 40 preferably has a permanent magnet. By using a permanent magnet, consumption of energy such as electric power can be suppressed. However, the adsorbing unit 40 may generate a magnetic field using an electromagnet or the like.

The adsorbing unit 40 retains the bound matter in the transfer unit 10. The phrase "in the transfer unit 10" refers to a region where drainage keeps flowing if the scrubber apparatus 120 is operating. The adsorbing unit 40 in the present example retains the adsorbed bound matter while at the same time exposing it to the drainage. The adsorbing unit 40 may be provided inside the pipe 20 or may be provided inside the tank 60. The transfer unit 10 may have a large diameter part which has a diameter larger than that of the pipe 20 and through which drainage flows in from the pipe 20 on the upstream side and the drainage flows out to the pipe 20 on the downstream side. The adsorbing unit 40 may be provided inside the large diameter part.

The adsorbing unit 40 is provided to a region in which drainage having passed therethrough can be expelled out of the marine vessel or the like. In the present example, at a point of divergence 11, the pipe 20 diverges into a pipe 20 that expels drainage out of the marine vessel or the like and a pipe 20 connected to the scrubber apparatus 120. In this case, the adsorbing unit 40 is arranged at a location that is in the transfer unit 10 and between the tank 60 and the point of divergence 11.

The adsorbing unit 40 is provided to be able to re-release adsorbed bound matter into the transfer unit 10. Thereby, if it becomes possible to expel drainage containing bound matter out of the marine vessel or the like, it is possible to re-release the temporarily retained bound matter easily into the drainage and to expel it out of the marine vessel or the like. For example, in some sea areas where the marine vessel is navigating or anchored, it is possible to expel drainage containing bound matter at a predetermined concentration out of the marine vessel. The control unit 70 may cause the adsorbing unit 40 to re-release bound matter based on the current position of the marine vessel. Furthermore, if the turbidity or suspended solid concentration of purified drainage of the scrubber apparatus 120 is no higher than a legal standard value, it is possible to expel it out of the marine vessel or the like to a sea area.

Figure 2A:
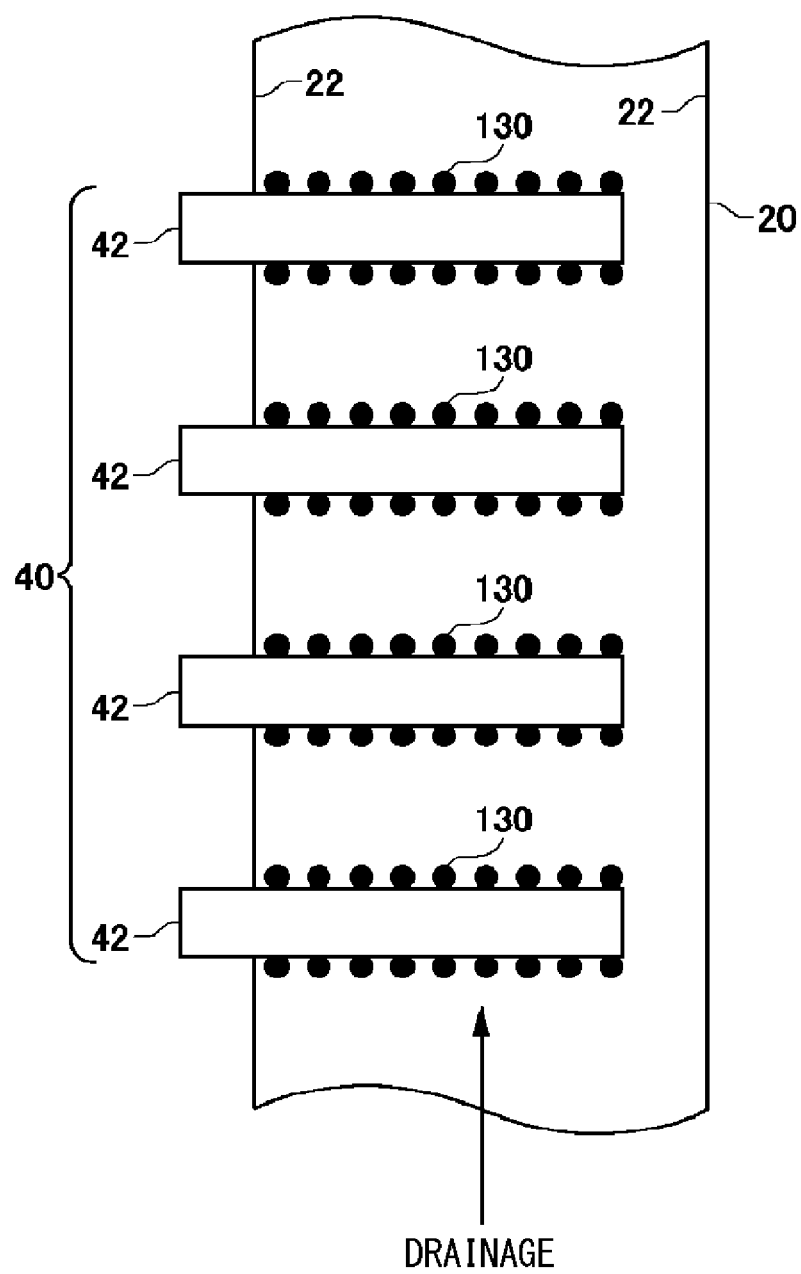
FIG. 2A is a cross-sectional view showing one example of an adsorbing unit 40.

FIG. 2A is a cross-sectional view showing one example of the adsorbing unit 40. The adsorbing unit 40 in the present example has a plurality of permanent magnets 42. The respective permanent magnets 42 are provided to be directly insertable into and removable from within the pipe 20. Being directly insertable and removable refers to that the surfaces of the permanent magnets 42 inserted into or removed from within the pipe 20 directly contact drainage.

A permanent magnet 42 passes through a through hole provided to a tube wall 22 of the pipe 20 to be partially or completely inserted into the pipe 20. The length of the permanent magnet 42 by which it is inserted into the pipe 20 may be larger than a half of the diameter of the pipe 20. Also, the length of the permanent magnet 42 by which it is inserted into the pipe 20 may be equal to the diameter of the pipe 20. In other words, a leading end of the permanent magnet 42 may contact a tube wall 22 opposite to the through hole.

As shown in FIG. 2A, the surface of a permanent magnet 42 inserted into the pipe 20 adsorbs bound matter 130 containing magnetic powders by magnetic force. The permanent magnet 42 may have a bar shape having a longer side. The permanent magnet 42 may have a cylindrical shape or a prism shape. Also, the surface of the permanent magnet 42 may be flat, may be a gently curved surface or may be uneven.

The plurality of permanent magnets 42 may be inserted into the pipe 20 such that the direction of their longer sides becomes orthogonal to the direction of extension of the pipe 20. In other words, they may be inserted into the pipe 20 such that the longer sides of the permanent magnets 42 become orthogonal to the direction in which drainage flows. Thereby, installation and insertion/removal of the permanent magnets 42 become easy. Being orthogonal or vertical refers to situations including a situation where they are at an angle of ±20 degrees, for example, in addition to a situation where they are strictly orthogonal or vertical.

Figure 2B:
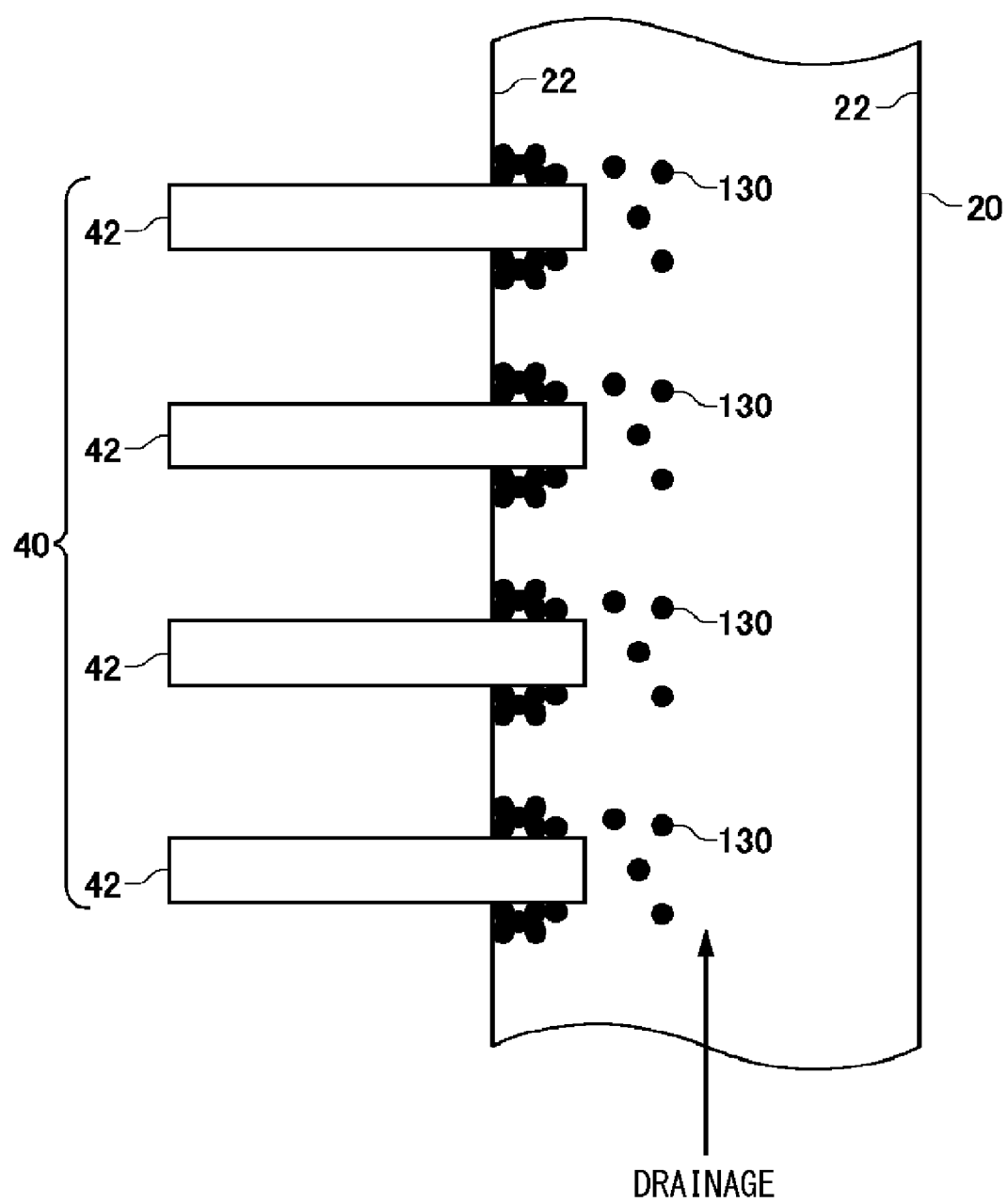
FIG. 2B is a cross-sectional view showing permanent magnets 42 while they are being removed from within a pipe 20.

FIG. 2B is a cross-sectional view showing the permanent magnets 42 while they are being removed from within the pipe 20. Reduction in the length of the permanent magnets 42 by which they extend in the pipe 20 leads to reduction in the area in which they can adsorb the bound matter 130. Also, the bound matter 130 adsorbed to the permanent magnets 42 is pushed into the pipe 20 by the tube wall 22. Because of this, the bound matter 130 adsorbed to the permanent magnet 42 is re-released into the pipe 20 along with removal of the permanent magnets 42 from within the pipe 20.

The measuring unit 80 measures the concentration of the bound matter 130 contained in drainage downstream of the adsorbing unit 40. For example, the concentration of the bound matter 130 can be estimated by measuring the turbidity or suspended solid concentration. The control unit 70 controls the amount of the permanent magnets 42 to be inserted to the pipe 20 based on a result of measurement at the measuring unit 80. The control unit 70 in the present example may control the amount by which the permanent magnets 42 are removed from the pipe 20 or the amount of removal per unit time such that the concentration of the bound matter 130 contained in drainage flowing in the transfer unit 10 downstream of the adsorbing unit 40 can be maintained in a predetermined tolerated range.

Also, the amount of the permanent magnets 42 that can appropriately remove the bound matter 130 contained in drainage depends also on the flow rate of the drainage. The control unit 70 may control the amount of the permanent magnets 42 by which they are inserted to the pipe 20, according to at least either one of the concentration of the bound matter 130 contained in drainage or the flow rate of drainage flowing through the pipe 20. The measuring unit 80 may measure the flow rate of drainage. The control unit 70 may use the amount of liquid supplied to the scrubber apparatus 120 per unit time or data about control of the pump 68 as information indicating the flow rate of drainage.

The amount of the permanent magnets 42 may refer to the surface area of the permanent magnets 42. More specifically, according to the concentration of the bound matter 130, the control unit 70 may control at least one among: the number of permanent magnets 42 to be removed from the pipe 20; the lengths of respective permanent magnets 42 by which they are to be removed from the pipe 20; and the speed of removal of respective permanent magnets 42 from the pipe 20.

If the permanent magnets 42 are removed from the pipe 20, the control unit 70 preferably removes them from the pipe 20 sequentially, starting from a permanent magnet 42 on the downstream side. Thereby, the bound matter 130 released from removed permanent magnets 42 can be prevented from being re-adsorbed to other permanent magnets 42.

Figure 3A:
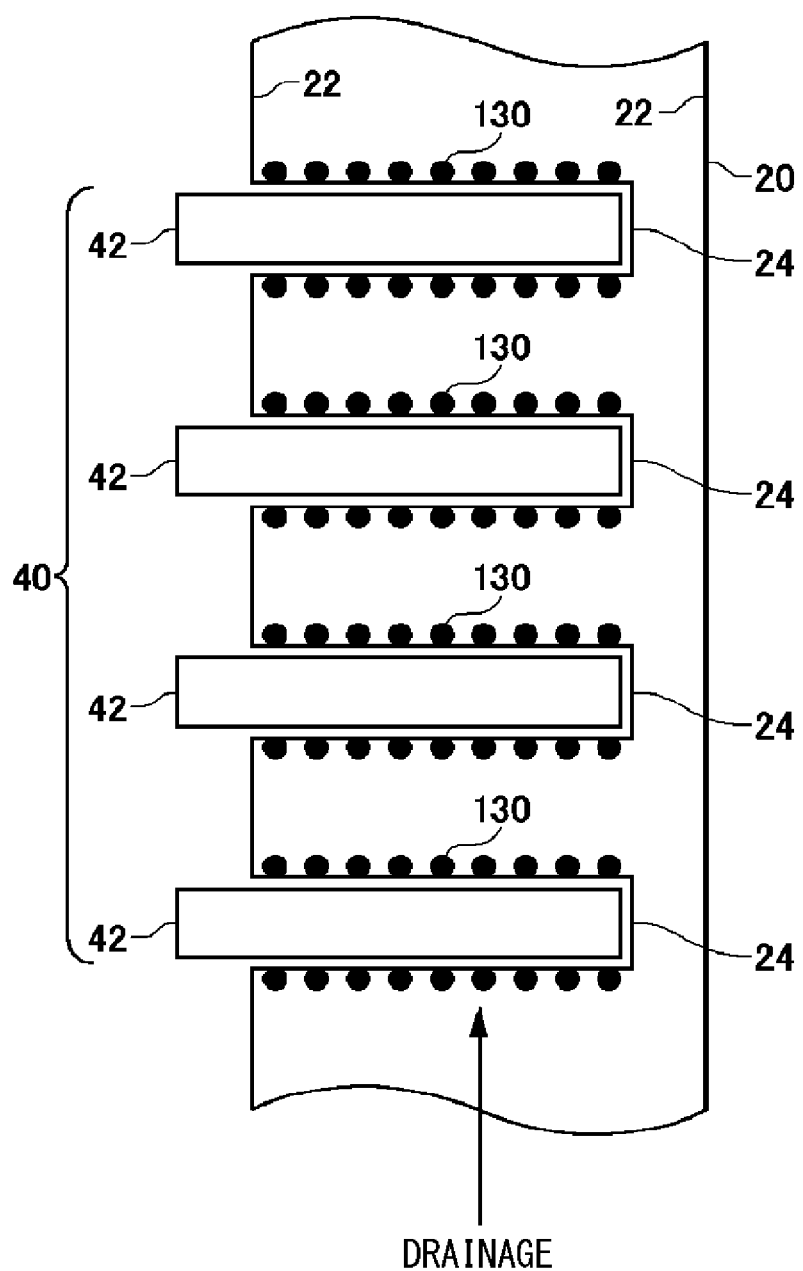
FIG. 3A is a cross-sectional view showing another example of the adsorbing unit 40 and the pipe 20.

FIG. 3A is a cross-sectional view showing another example of the adsorbing unit 40 and the pipe 20. A tube wall 22 of the pipe 20 in the present example is provided with a plurality of depressions 24 to and from which the permanent magnets 42 are insertable and removable. The shape of the respective depressions 24 are almost the same as the shape of the permanent magnets 42. In the present example, the longitudinal direction of the depressions 24 is vertical to the direction of extension of the pipe 20.

The depressions 24 are provided to extend toward the inside of the pipe 20. Although the permanent magnets 42 in the present example can be inserted to and removed from the inside of the pipe 20, they do not directly contact drainage. Surfaces of the depressions 24 on the permanent magnet 42 side are referred to as outer walls, and surfaces of the depressions 24 on the drainage side are referred to as inner walls. The permanent magnets 42 inserted to the depressions 24 are covered by the outer surfaces of the depressions 24.

If the permanent magnets 42 are inserted to the depressions 24, the bound matter 130 is adsorbed to the inner walls of the depressions 24 due to magnetic force of the permanent magnets 42. The inner walls of the depressions 24 may be flat, may be gently curved surfaces or may be uneven. Even with such a structure, the bound matter 130 can be retained inside the pipe 20.

Figure 3B:
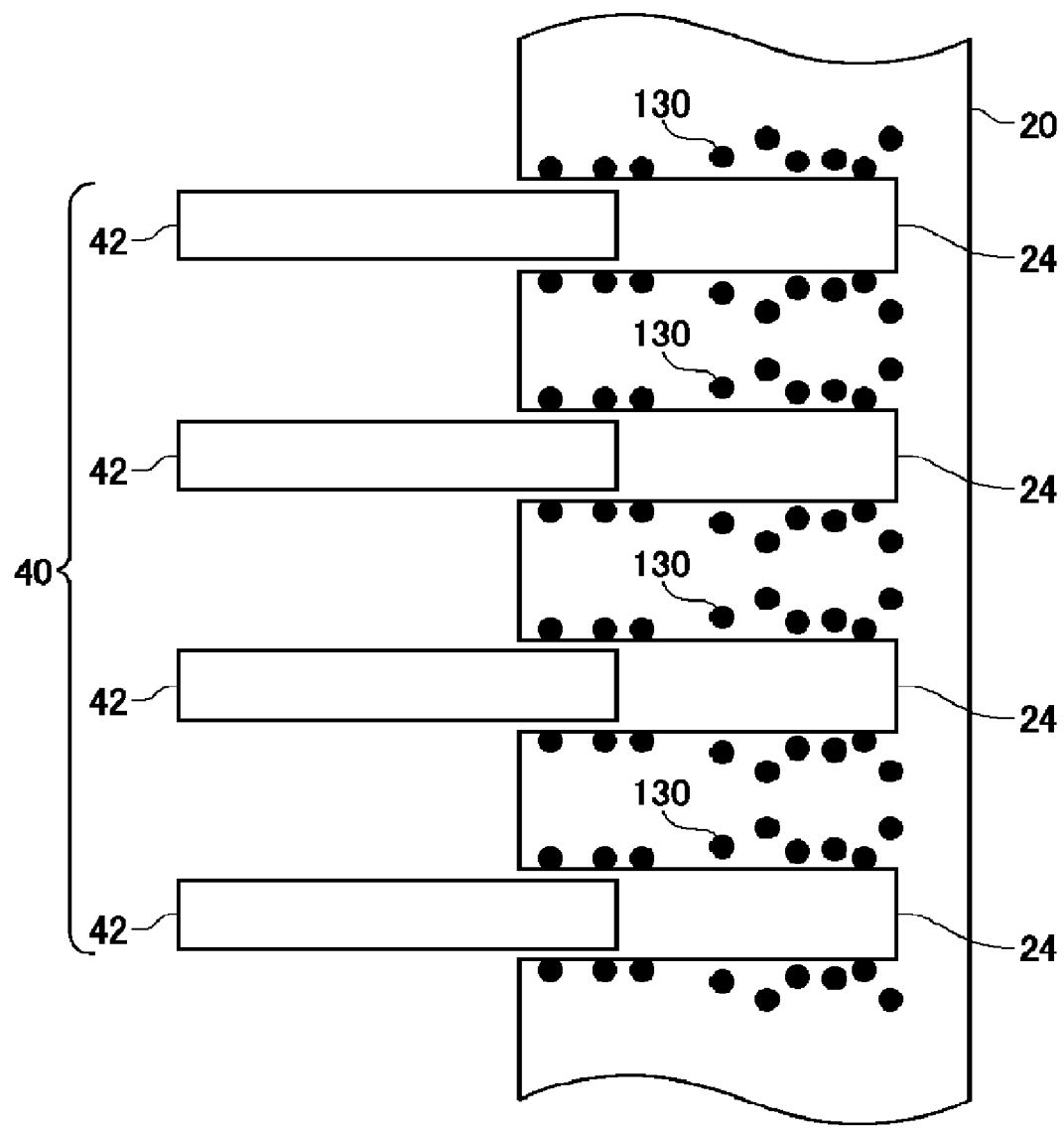
FIG. 3B is a cross-sectional view showing the permanent magnets 42 while they are being removed from within the pipe 20.

FIG. 3B is a cross-sectional view showing the permanent magnets 42 while they are being removed from within the depressions 24. Reduction in the lengths of the permanent magnets 42 by which they extend in the depressions 24 leads to reduction in the area of the inner walls of the depressions 24 to which they can adsorb the bound matter 130. Because of this, the bound matter 130 adsorbed to the inner walls of the depressions 24 is re-released into the pipe 20 along with removal of the permanent magnets 42 from within the depressions 24.

Because according to the example of FIG. 3A and FIG. 3B, the permanent magnets 42 are not exposed to drainage, maintenance of the permanent magnets 42 becomes easy. Also, because the depressions 24 can be formed integrally with the pipe 20, the sealability of the pipe 20 can be enhanced. The depressions 24 may be formed of the same material as the pipe 20, and may be formed of a metallic material such as stainless steel or iron. Also, the depressions 24 may be formed of a resin material or plastic material such as polyvinylidene fluoride or polytetrafluoroethylene. The inner walls of the depressions 24 may be subjected to a preservative and anticorrosive treatment.

Also, the thickness of walls of the depressions 24 correspond to the distance between the permanent magnets 42 and drainage. Increase in the thickness results in lowering of magnetic force to act on the bound matter 130 so that the thickness is preferably no larger than 10 mm.

Figure 4:
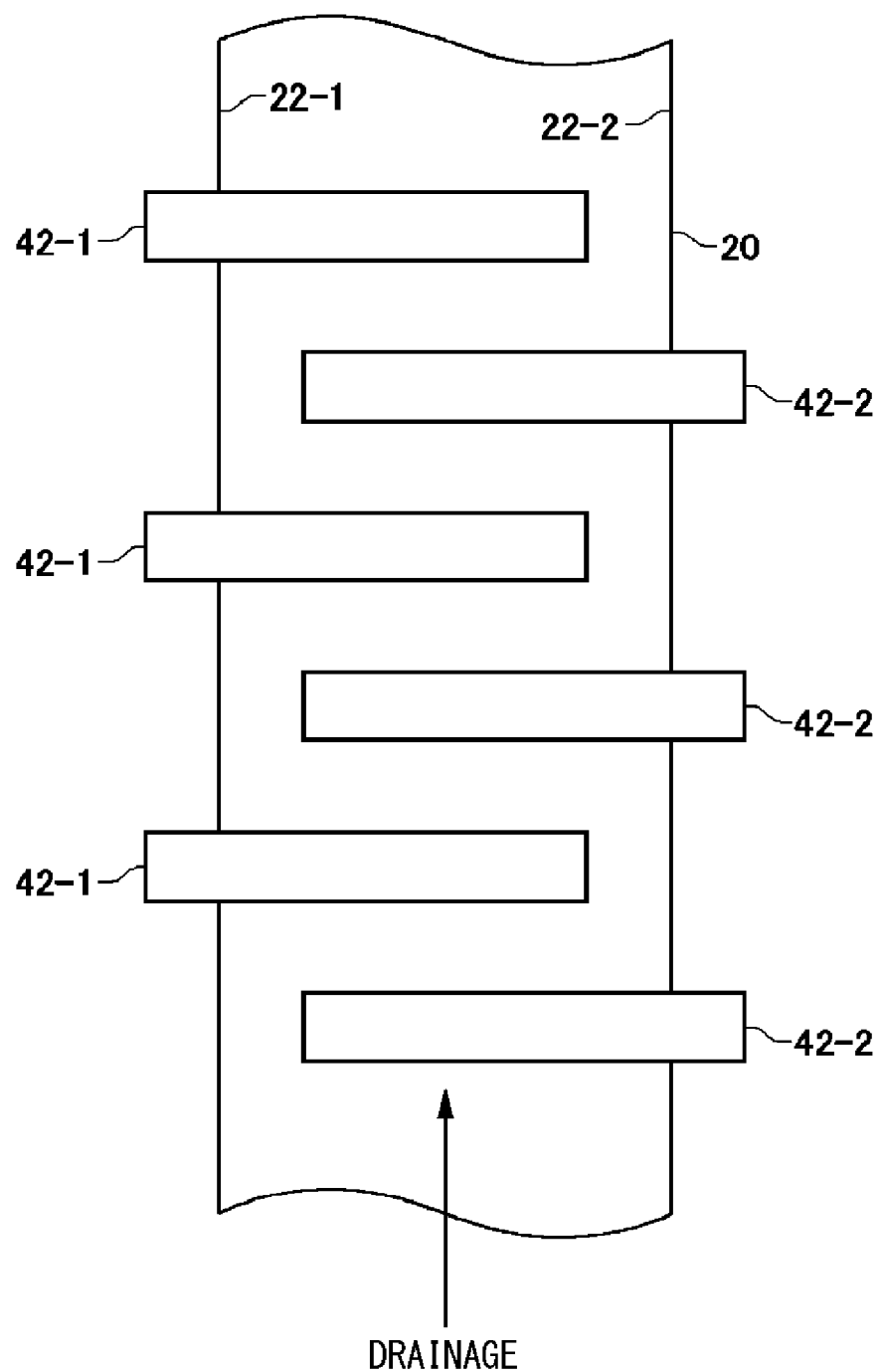
FIG. 4 is a diagram showing an arrangement example of the permanent magnets 42.

FIG. 4 is a diagram showing an arrangement example of the permanent magnets 42. The permanent magnets 42 may be in the form as shown in FIGS. 2A and 2B in which they are directly inserted into and removed from within the pipe 20, or may be in the form as shown in FIGS. 3A and 3B in which they are inserted to and removed from the depressions 24. The permanent magnets 42 in each example explained in the present specification may be in the form shown in FIG. 2A and FIG. 2B or may be in the form shown in FIG. 3A and FIG. 3B, unless otherwise specified.

The permanent magnets in the present example have one or more first permanent magnets 42-1, and one or more second permanent magnets 42-2. The first permanent magnets 42-1 are arranged on a tube wall 22-1 of the pipe 20 such that their longitudinal direction is orthogonal to the direction of extension of the pipe 20. The second permanent magnets 42-2 are provided to the tube wall 22-1 of the pipe 20 and at positions different from those of the first permanent magnets 42-1 in the direction of extension of the pipe 20. For example, in the direction of extension of the pipe 20, the first permanent magnets 42-1 and the second permanent magnets 42-2 are arranged alternately.

Also, the second permanent magnets 42-2 are provided to a tube wall 22-2 opposite to the first permanent magnets 42-1. The tube wall 22-1 and tube wall 22-2 in the present example are tube walls that face each other sandwiching the center of the pipe 20. With such an arrangement, the amount of drainage that passes through without contacting the permanent magnets 42 can be reduced. Because of this, the bound matter 130 can be adsorbed efficiently.

Figure 5:
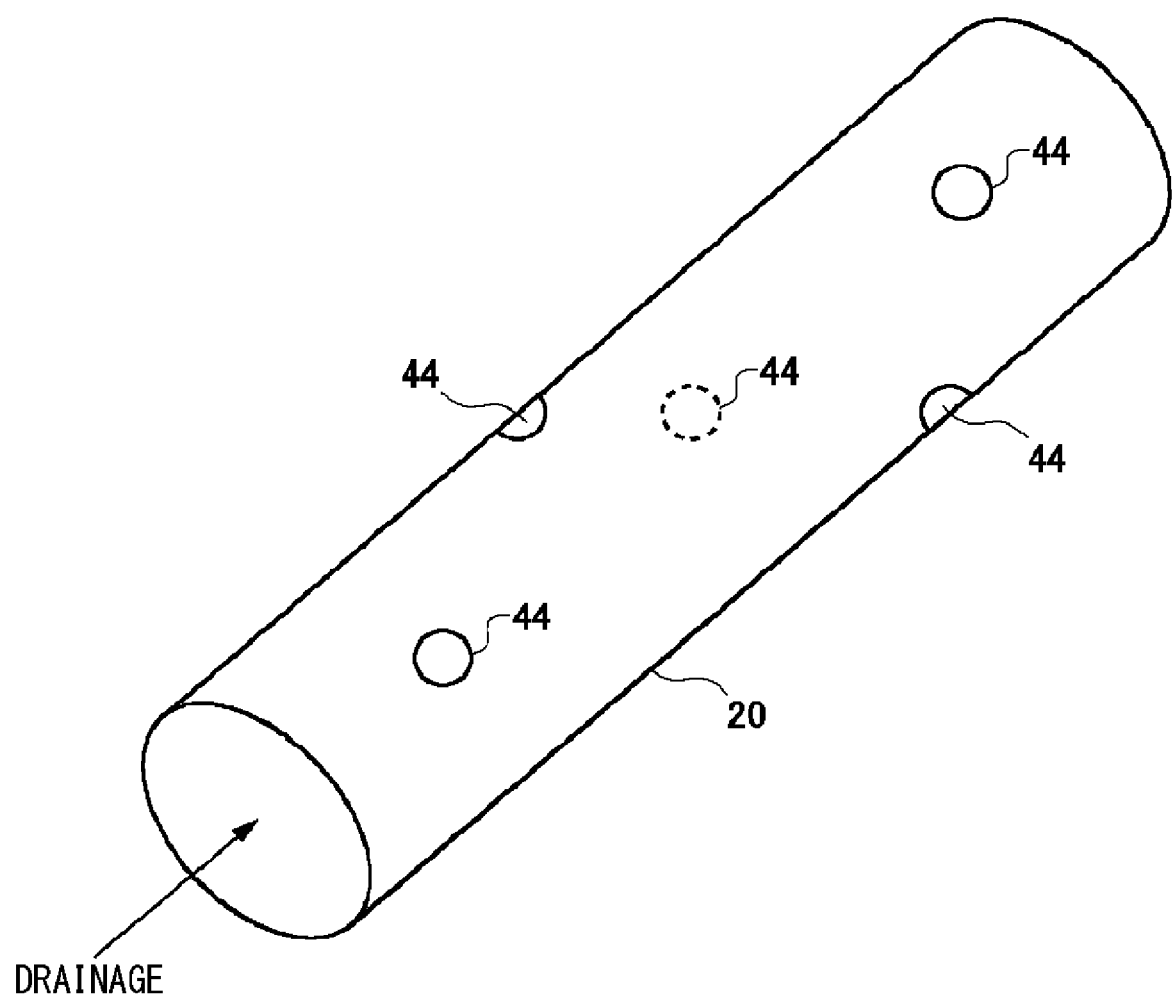
FIG. 5 is a perspective view showing one example of positions 44 at which the permanent magnets 42 are arranged in the pipe 20.

FIG. 5 is a perspective view showing one example of positions 44 at which the permanent magnets 42 are arranged in the pipe 20. The position 44 provided to the surface opposite to the surface of the pipe 20 shown in FIG. 5 is indicated with a dotted line.

The respective permanent magnets 42 are arranged at positions that are different from each other in the direction of extension of the pipe 20. Also, although in the example of FIG. 4, the permanent magnets 42 that are adjacent to each other in the direction of extension of the pipe 20 are provided at positions that are displaced by 180 degrees in a cross-section of the pipe 20 (in other words, on opposite tube walls 22), the permanent magnets 42 adjacent to each other in the present example are provided at positions that are displaced by 90 degrees in a cross-section of the pipe 20. The angles for installation of the adjacent permanent magnets 42 are not limited to the above-mentioned angles. With such an arrangement, the amount of drainage that passes through without contacting the permanent magnets 42 can further be reduced. Because of this, the bound matter 130 can be adsorbed still efficiently.

Figure 6:
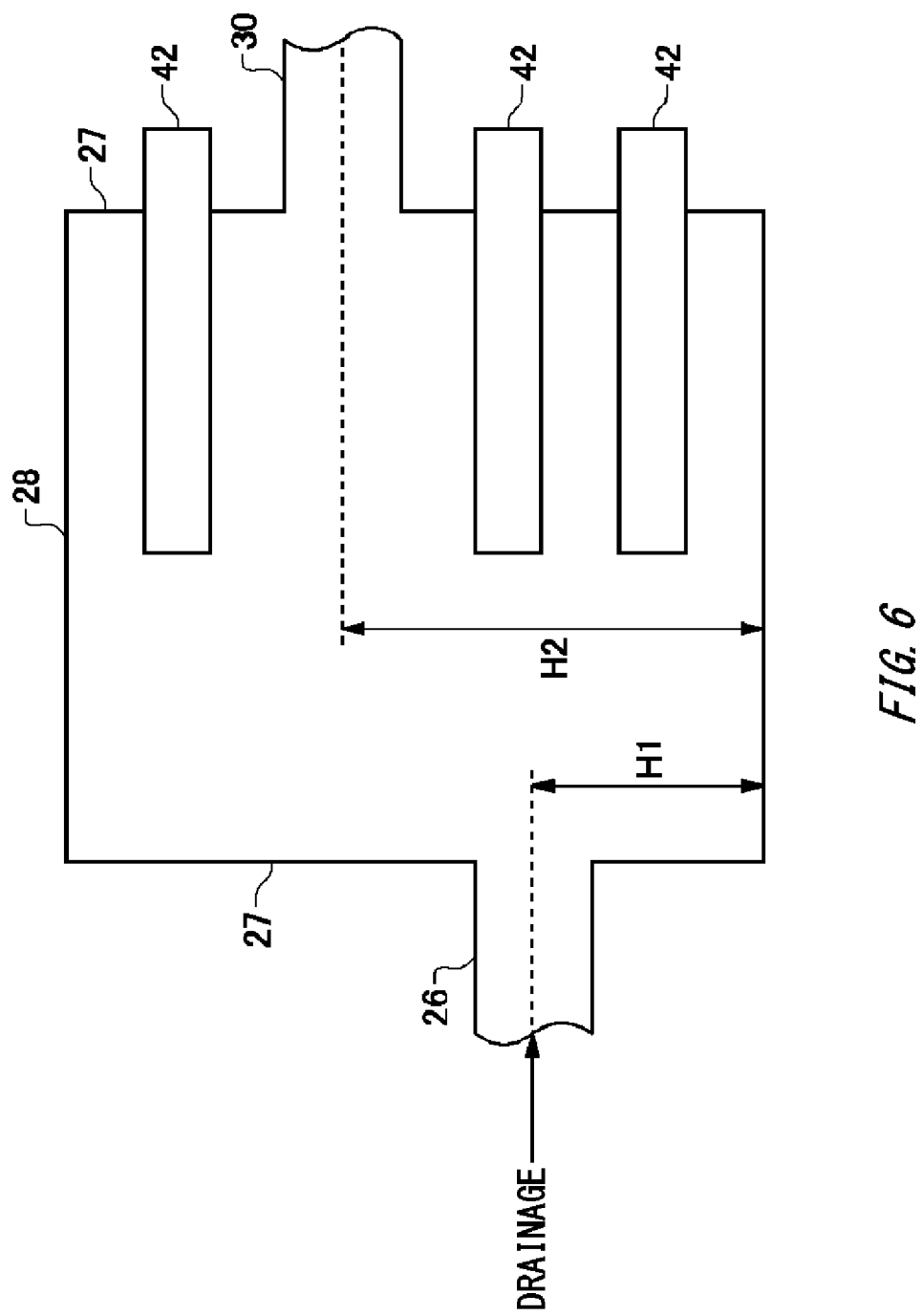
FIG. 6 is a diagram showing another arrangement example of the permanent magnets 42.

FIG. 6 is a diagram showing another arrangement example of the permanent magnets 42. The permanent magnets 42 in the present example are inserted such that the direction of their longer sides becomes parallel with the direction of extension of the transfer unit 10 (that is, the direction in which drainage flows). Being parallel refers to situations including a situation where they are at an angle of ±20 degrees, for example, in addition to a situation where they are strictly parallel.

The transfer unit 10 in the present example has a large diameter part 28 to which a pipe 26 on the upstream side and a pipe 30 on the downstream side are connected and that has a diameter larger than those of the pipe 26 and pipe 30. The large diameter part 28 has two side surfaces 27 to which the pipe 26 and pipe 30 are connected. The side surfaces 27 may be surfaces almost vertical to the direction of extension of the transfer unit 10.

In the present example, the two side surfaces 27 are arranged to be opposite to each other. An opening for the pipe 26 is formed on one side surface 27, and an opening for the pipe 30 is formed on the other side surface 27. The permanent magnets 42 in the present example are provided to a side surface 27 such that their longitudinal direction becomes orthogonal to the side surfaces 27. The permanent magnets 42 may be provided to the side surface 27 corresponding to the pipe 30 on the downstream side, may be provided to the side surface 27 corresponding to the pipe 26 on the upstream side, or may be provided to both the side surfaces 27. With such a structure, the longer sides of the permanent magnets 42 can be arranged along the flow of drainage. Accordingly, it is possible to keep drainage staying in a magnetic field generated by the permanent magnets 42 longer and to adsorb the bound matter 130 efficiently.

Also, the opening on the side surface 27 for the pipe 26 and the opening on the side surface 27 for the pipe 30 may be provided at positions at which they do not face each other.

In other words, the heights H1 and H2 of the respective openings from a predetermined bottom surface of the large diameter part 28 may be different from each other. Thereby, drainage can be brought into contact with the permanent magnets 42 efficiently.

Figure 7:
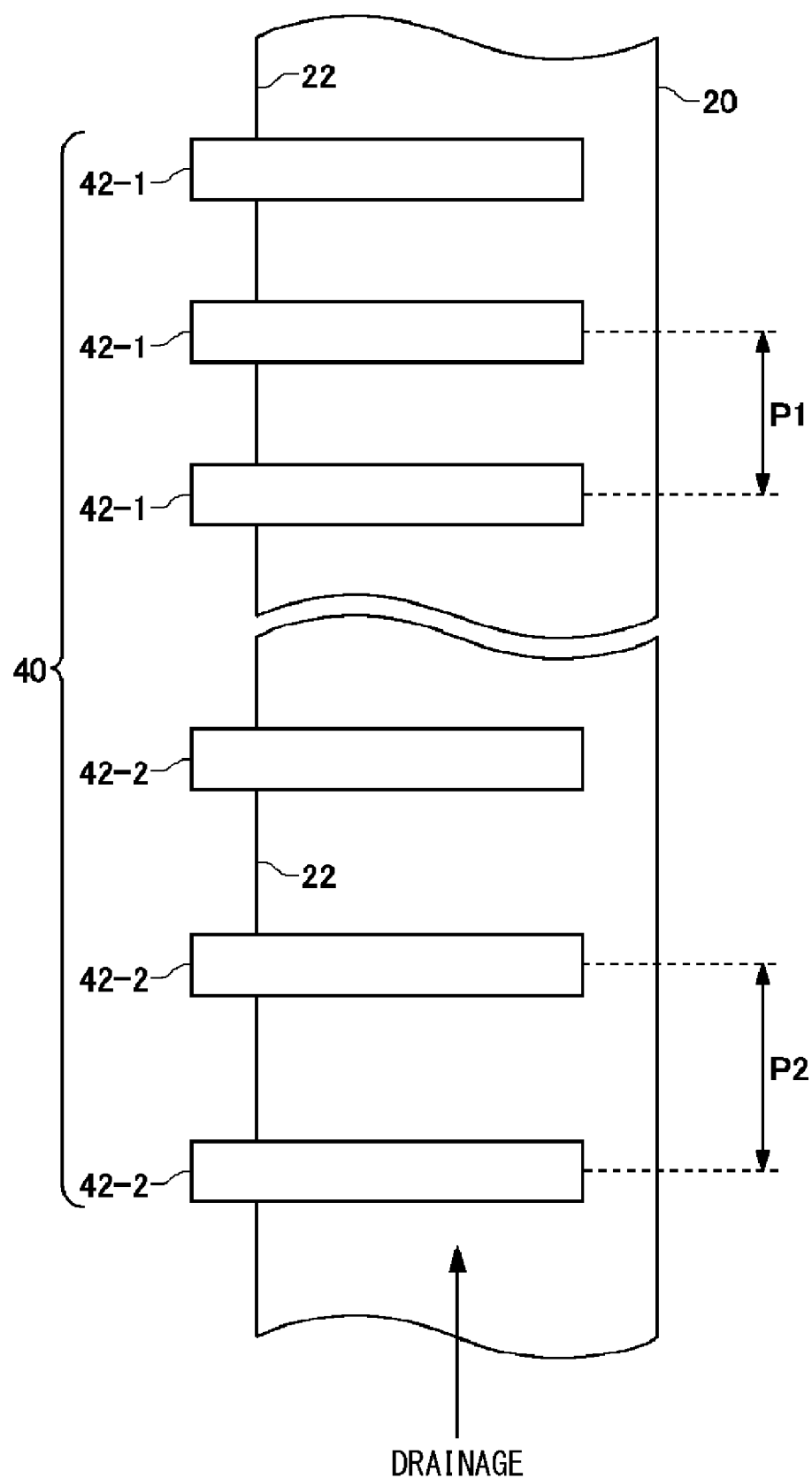
FIG. 7 is a diagram showing another arrangement example of the permanent magnets 42.

FIG. 7 is a diagram showing another arrangement example of the permanent magnets 42. The adsorbing unit 40 in the present example has a plurality of the permanent magnets 42 arranged along the direction of extension of the pipe 20. The permanent magnets 42 are arranged on a tube wall 22 such that their longitudinal direction becomes orthogonal to the direction of extension of the pipe 20. However, the density of a plurality of second permanent magnets 42-2 upstream of the pipe 20 is lower than the density of a plurality of first permanent magnets 42-1 downstream of the pipe 20. In other words, the arrangement interval P2 of the second permanent magnets 42-2 in at least a partial region on the upstream side is larger than the arrangement interval P1 of at least some of the first permanent magnets 42-1 on the downstream side.

Because upon passage of drainage through the pipe 20 into which the plurality of permanent magnets 42 are inserted, the bound matter 130 is adsorbed to the permanent magnets 42 on the upstream side, the concentration of the bound matter 130 in the drainage becomes lower on the downstream side. Because of this, if the density of the permanent magnets 42 on the downstream side is low, the bound matter 130 in the drainage cannot be sufficiently adsorbed, and this results in the bound matter 130 being fed back to the scrubber apparatus 120 in some cases. By increasing the density of the permanent magnets 42 on the downstream side as in the present example, it is possible to prevent the bound matter 130 from being fed back to the scrubber apparatus 120.

Figure 8:
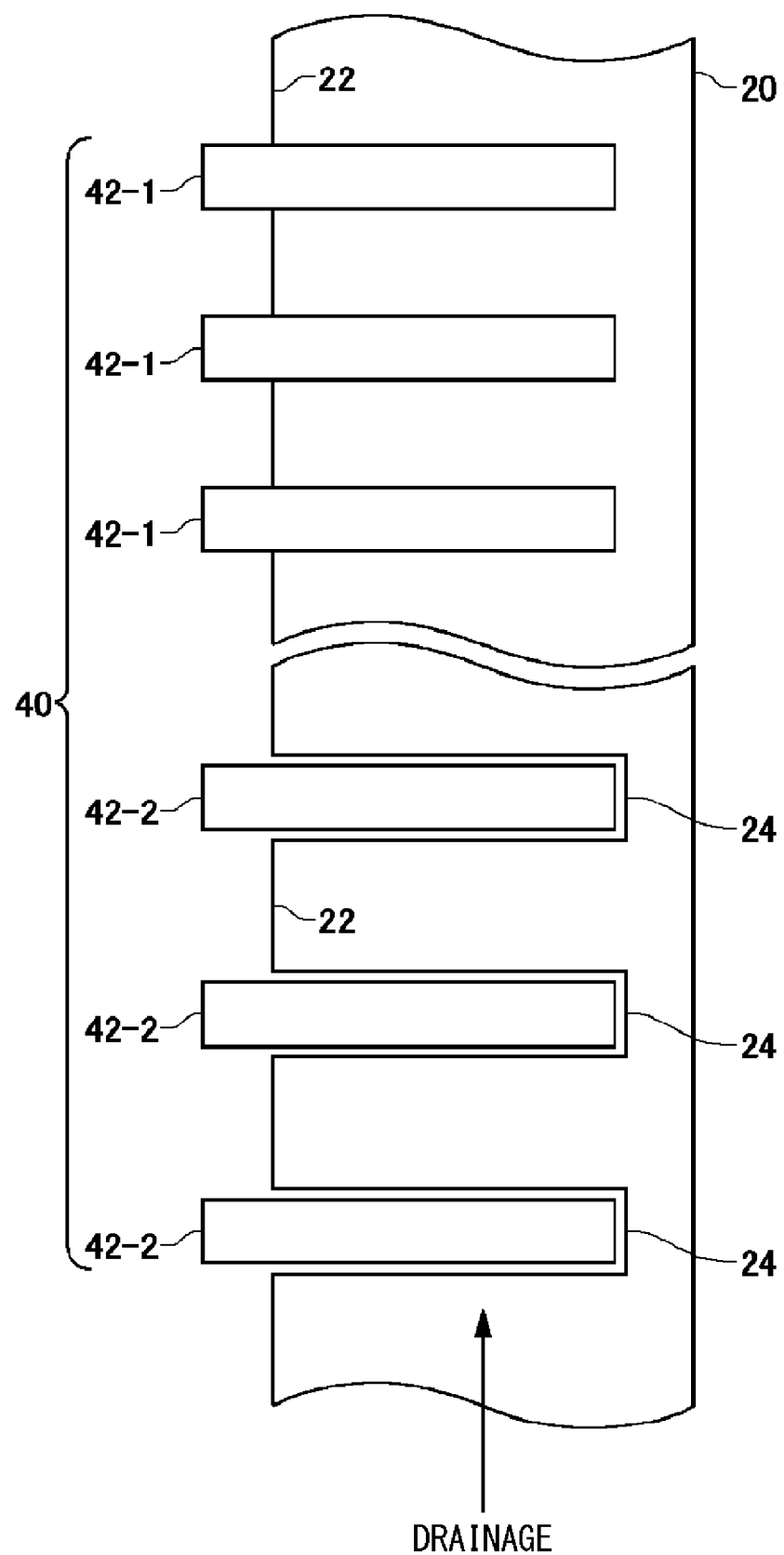
FIG. 8 is a diagram showing another arrangement example of the permanent magnets 42.

FIG. 8 is a diagram showing another arrangement example of the permanent magnets 42. The adsorbing unit 40 in the present example has a plurality of the permanent magnets 42 arranged along the direction of extension of the pipe 20. The permanent magnets 42 are arranged on a tube wall 22 such that the direction of their longitudinal direction becomes orthogonal to the direction of extension of the pipe 20. However, the plurality of second permanent magnets 42-2 upstream of the pipe 20 are inserted to the depressions 24 as shown in FIG. 3A and FIG. 3B. In other words, the depressions 24 corresponding to the second permanent magnets 42-2 are formed on the tube wall 22 of the pipe 20.

In contrast to this, at least some of the first permanent magnets 42-1 downstream of the second permanent magnets 42-2 are directly inserted into and removed from within the pipe 20 as shown in FIG. 2A and FIG. 2B. Because the first permanent magnets 42-1 are directly inserted into the pipe 20, their adsorption power that acts on the bound matter 130 is higher than that of the second permanent magnets 42-2 and depressions 24. Because of this, even on the downstream side where the concentration of the bound matter 130 is low, the bound matter 130 can be adsorbed.

On the other hand, the second permanent magnets 42-2 are arranged on the upstream side where the concentration of the bound matter 130 is high. Because of this, the bound matter 130 can be sufficiently adsorbed even if the adsorption power is lower than that of the first permanent magnets 42-1. Also, because the second permanent magnets 42-2 arranged on the upstream side become less likely to be contaminated, the cost of maintenance can be reduced.

Figure 9:
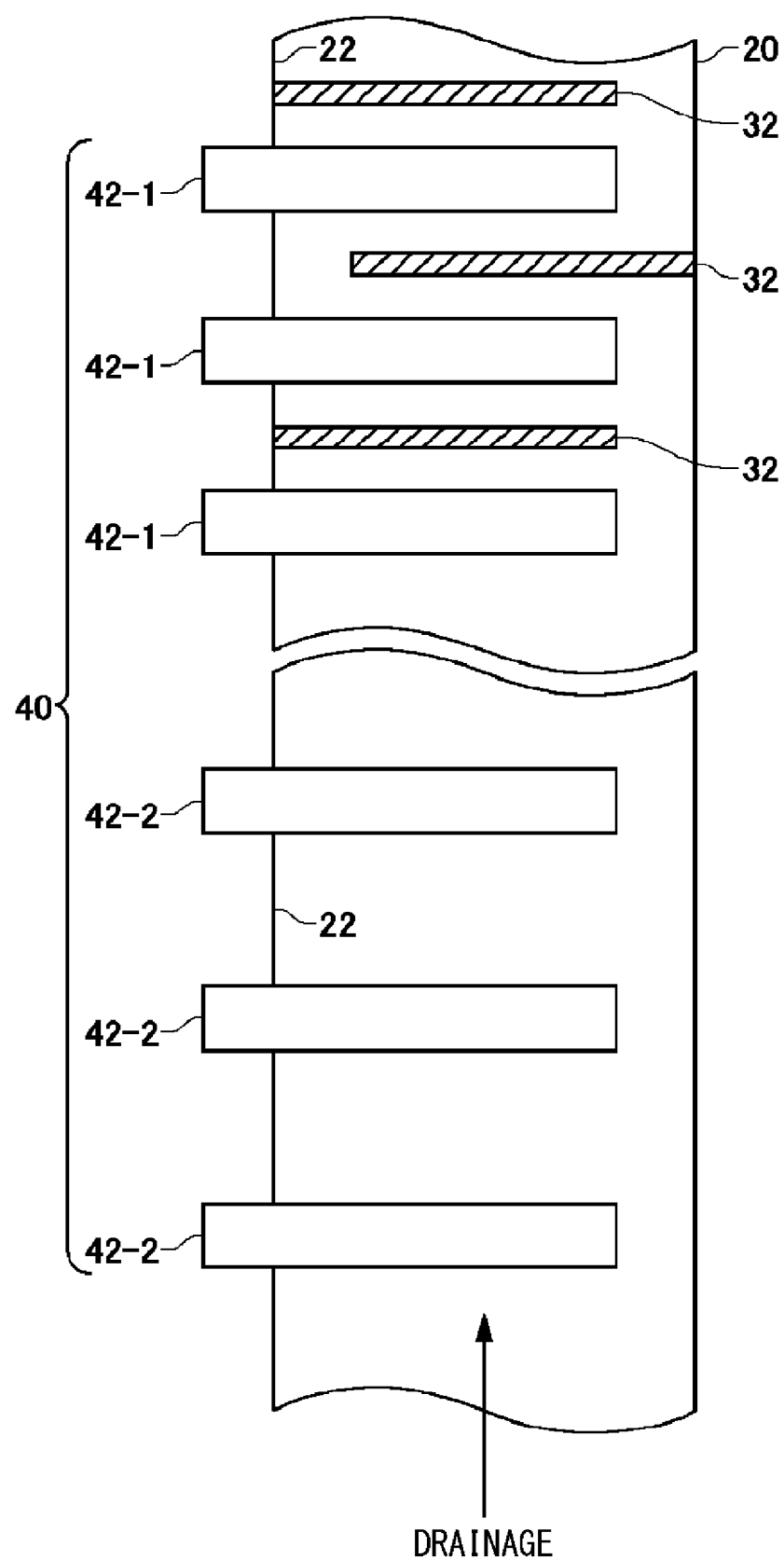
FIG. 9 is a diagram showing a configuration example of the pipe 20.

FIG. 9 is a diagram showing a configuration example of the pipe 20. The pipe 20 in the present example has tabular portions 32 that extend inside the pipe 20 and in a direction different from the direction of extension of the pipe 20. At least one tabular portion 32 may be provided to extend from a tube wall opposite to a tube wall to which the permanent magnets 42 are inserted and to reach a region sandwiched by two permanent magnets 42. Also, at least one tabular portion 32 may be provided to extend from a tube wall on the same side with the tube wall to which the permanent magnets 42 are inserted and to be sandwiched by two permanent magnets. The tabular portions 32 may have a width larger than that of the permanent magnets 42.

With such a structure, drainage can be caused to flow along the longitudinal direction of the permanent magnets 42. Accordingly, it is possible to keep drainage staying in a magnetic field generated by the permanent magnets 42 longer and to adsorb the bound matter 130 efficiently.

In the present example, tabular portions 32 are not provided to the second permanent magnets 42-2 upstream of the pipe 20. Also, the tabular portions 32 are provided to at least some of the first permanent magnets 42-1 downstream of the second permanent magnets 42-2. Thereby, the bound matter 130 can be efficiently adsorbed to the permanent magnets 42 on the downstream side where the concentration of the bound matter 130 is relatively low.

Figure 10:
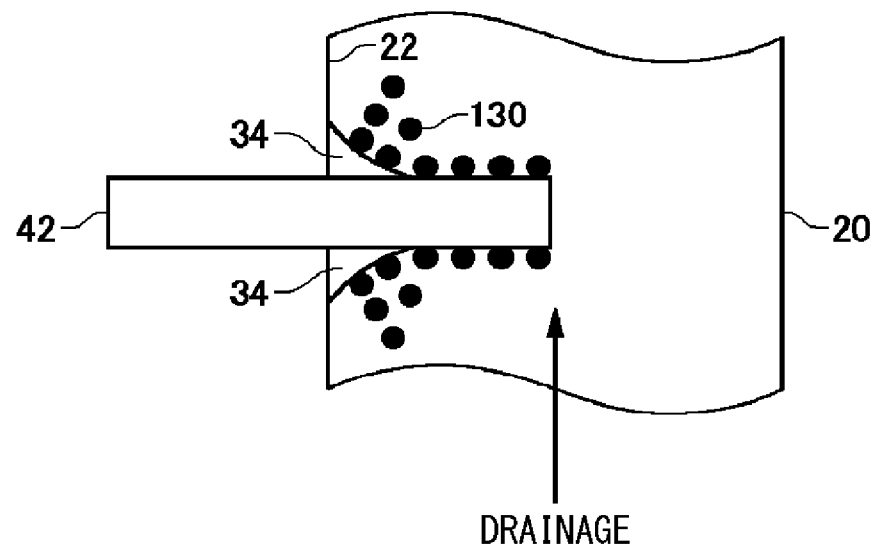
FIG. 10 is a cross-sectional view showing a structural example of the pipe 20.

FIG. 10 is a cross-sectional view showing a structural example of the pipe 20. The inner wall of the pipe 20 in the present example is provided with protruding parts 34 to scrape off the bound matter 130 adsorbed to surfaces of the permanent magnets 42 along with removal of the permanent magnets 42 from the pipe 20. The permanent magnets 42 are directly inserted into and removed from within the pipe 20 as shown in FIG. 2A and FIG. 2B.

The protruding parts 34 are formed to protrude from a tube wall 22 along the surface of a permanent magnet 42 inserted into the pipe 20. At least part of a protruding part 34 may contact the surface of the permanent magnet 42, or the entire protruding part 34 may be provided at a small distance from the surface of the permanent magnet 42. A protruding part 34 may have a tapered shape having a cross-sectional area that dwindles as the distance from the tube wall 22 increases.

Along with removal of the permanent magnet 42 from the pipe 20, the bound matter 130 adsorbed to the surface of the permanent magnet 42 is peeled off from the permanent magnet 42 by the protruding parts 34 and re-released into the pipe 20. With such a structure, the bound matter 130 can be efficiently re-released into the pipe 20.

Figure 11A:
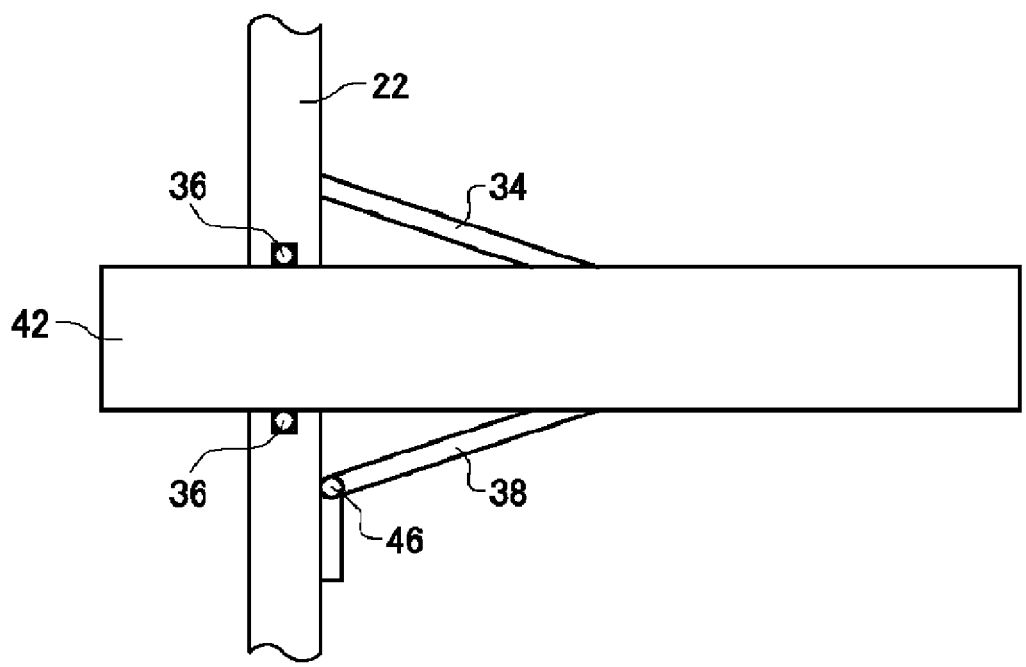
FIG. 11A is a cross-sectional view showing another structural example of the pipe 20.
Figure 11B:
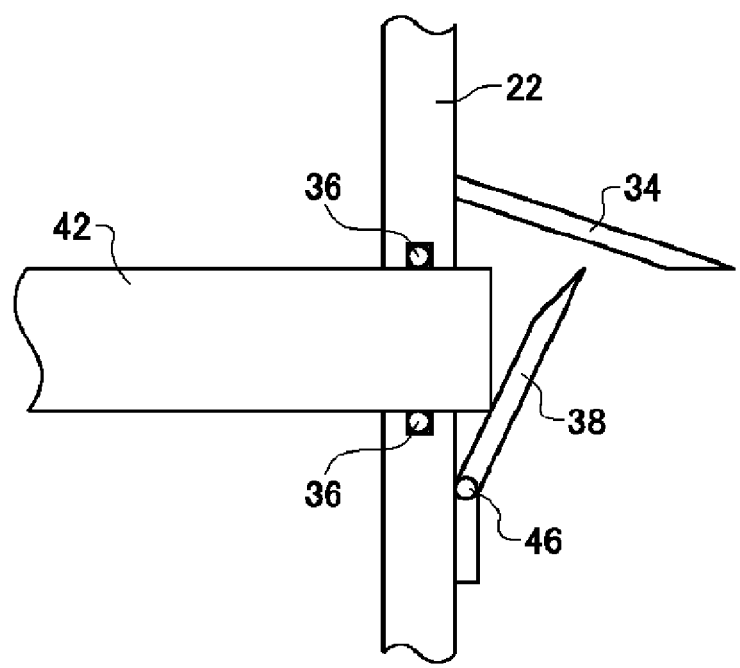
FIG. 11B is a cross-sectional view showing another structural example of the pipe 20.

FIG. 11A and FIG. 11B are cross-sectional views showing another structural example of the pipe 20. The pipe 20 in the present example has a valve unit 38 that closes off an opening of a tube wall 22 at the same time when a permanent magnet 42 is completely removed from within the pipe 20. The valve unit 38 has a shape that can cover the entire opening of the tube wall 22. Sealing rings 36 are provided to end portions of the tube wall 22 that face the permanent magnet 42.

The valve unit 38 has a hinge 46 fixed to the tube wall 22. The hinge 46 is elastic to rotate the valve unit 38 in the direction to close off the opening of the tube wall 22. If the permanent magnet 42 is inserted into the pipe 20, the valve unit 38 is pushed open along the permanent magnet 42. If the permanent magnet 42 is inserted into the pipe 20 by a length which is no shorter than a predetermined length, the leading end of the valve unit 38 contacts the surface of the permanent magnet 42. The valve unit 38 may function as a protruding part to scrape off the bound matter 130 if the permanent magnet 42 is removed from the pipe 20.

Protruding parts 34 may be provided around the permanent magnet 42, except for a region where the valve unit 38 is provided. For example, if the permanent magnet 42 is a quadrangular prism, among the four sides surrounding the permanent magnet 42, a valve unit 38 may be provided to one side on the upstream side, and the protruding parts 34 may be provided to the other three sides. However, as shown in FIG. 11B, the protruding parts 34 are provided to not contact the valve unit 38 if the valve unit 38 is opened or closed. The protruding parts 34 may have a space in a region where the valve unit 38 moves.

In the structures shown in FIG. 1 to FIG. 11B, the distance between permanent magnets 42 in the direction of extension of the pipe 20 may be no shorter than 10 mm and no longer than 100 mm. If the distance between the permanent magnets 42 is too short, the permanent magnets 42 readily interfere with each other. If the distance between the permanent magnets 42 is too long, their capability to adsorb the bound matter 130 degrades.

Figure 12:
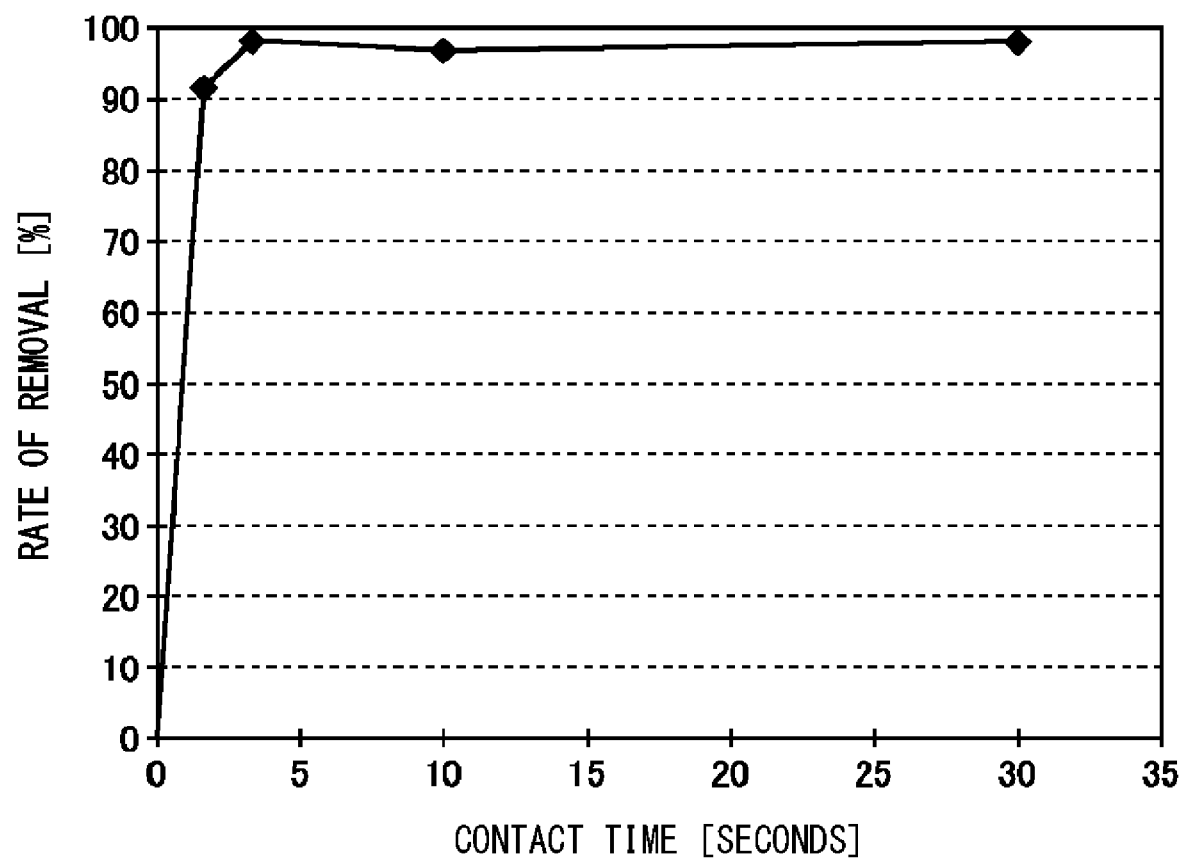
FIG. 12 is a diagram showing the relationship between time during which drainage is contacting the permanent magnets 42 and the rate of removal of bound matter 130 in the drainage.

FIG. 12 is a diagram showing the relationship between time during which drainage is contacting the permanent magnets 42 and the rate of removal of the bound matter 130 in the drainage. In the present example, one permanent magnet 42 having a length of 300 mm, a diameter of 10 mm and a magnetic force of 1 T was used. Inside the pipe 20 having a diameter of 100 mm, the permanent magnet 42 was arranged such that its longitudinal direction becomes parallel with the direction of extension of the pipe. The rate of removal of the bound matter 130 in drainage was measured while changing the flow rate of drainage to be caused to flow through the pipe 20 to: 300 mm/sec (contact time: 1 second); 100 mm/sec (contact time: 3 seconds); 30 mm/sec (contact time: 10 seconds); and 10 mm/sec (contact time: 30 seconds).

5000 mg/L of black carbon, 5000 mg/L of magnetic powders, and 1 mg/L of an anion coagulant were added to the drainage, and the mixture was stirred for one minute at 50 rpm. The liquid temperature was 20 degrees, and no pH control chemicals were added.

As shown in FIG. 12, if the contact time was no shorter than 1 second, the rate of removal of the bound matter 130 became no lower than 90%. It is preferable to provide permanent magnets 42 such that the time of contact between the permanent magnets 42 and the drainage becomes no shorter than 1 second.

Also, the control unit 70 may control the amount of the permanent magnets 42 to be inserted to the pipe 20, according to the flow rate of drainage. For example, as the flow rate of drainage increases, the amount of permanent magnets 42 to be inserted to the pipe 20 is increased, and as the flow rate of drainage decreases, the amount of permanent magnets 42 to be inserted to the pipe 20 is reduced. Thereby, an appropriate amount of permanent magnets 42 can be inserted to the pipe 20, and pressure loss due to the presence of the permanent magnets 42 in drainage can be reduced.

Figure 13:
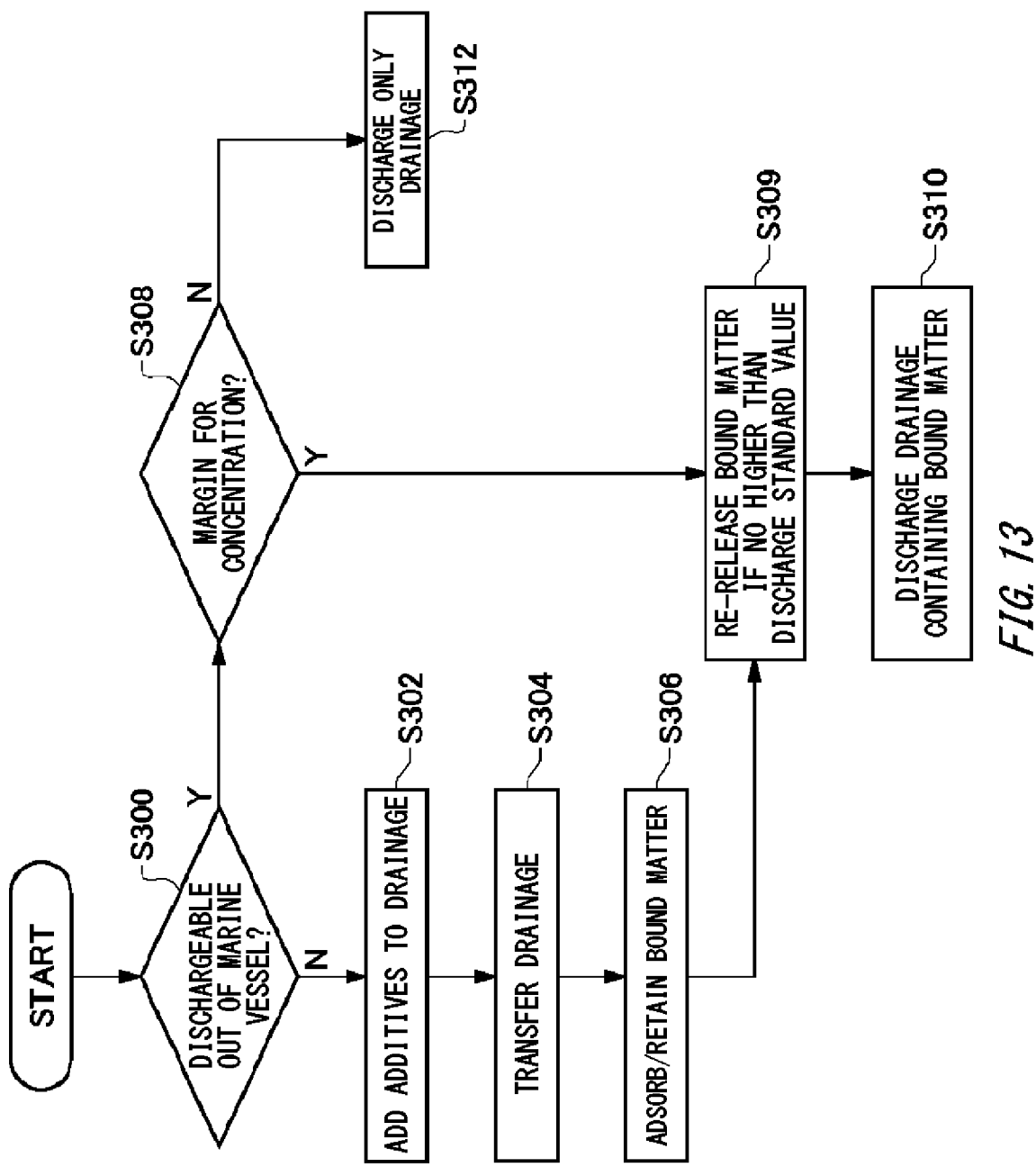
FIG. 13 is a flowchart showing the summary of operation of the drainage processing apparatus 100.

FIG. 13 is a flowchart showing the summary of operation of the drainage processing apparatus 100. At a first judgment step S300, the drainage processing apparatus 100 judges whether or not drainage can be discharged to the outside. For example if the drainage processing apparatus 100 is installed in a marine vessel, the control unit 70 judges that drainage can be discharged to the outside if the marine vessel is positioned in a sea area where drainage containing bound matter can be discharged and the concentration of the bound matter in the drainage and turbidity of the drainage measured by the measuring unit 80 are no higher than a standard value for judging that drainage can be discharged in the sea area. The control unit 70 may perform judgement at S300 at a predetermined cycle.

If it is judge at the first judgment step S300 that the drainage cannot be discharged, at an addition step S302, the drainage processing apparatus 100 adds additives such as magnetic powders, a coagulant or a pH control chemical to the drainage expelled from the scrubber apparatus 120. The drainage processing apparatus 100 adds the respective additives to drainage expelled from the scrubber apparatus 120, according to the turbidity, suspended solid concentration or pH value of the drainage. In the example shown in FIG. 1, the respective additives are added to drainage stored in the tank 60.

Next, at a transfer step S304, the drainage to which the additives are added is transferred in the transfer unit 10. At the transfer step S304, the drainage may be transferred so as to be fed back to the scrubber apparatus 120.

Also, the drainage processing apparatus 100 executes an adsorption step S306, together with the transfer stage S304. At the adsorption step S306, the adsorbing unit 40 provided in the transfer unit 10 adsorbs bound matter formed by a process-target substance and the magnetic powders contained in the drainage. Also, the adsorbed bound matter is retained in the transfer unit 10.

If it is judged at the first judgment step S300 that the drainage can be discharged, at a second judgment step S308, the control unit 70 judges whether or not there are margins for the bound matter concentration of the drainage and the turbidity of the drainage. In other words, the control unit 70 judges whether the concentration of the bound matter in the drainage and the turbidity will not exceed the standard values even if the bound matter adsorbed to the permanent magnets 42 is re-released into the drainage. The measuring unit 80 may measure the bound matter concentration and turbidity of the drainage in the tank 60 or in the pipe 20 entering the tank 60. The standard values that can be used are values based on legal standard values, for example. The control unit 70 may determine the amount of re-releasable bound matter based on the current bound matter concentration and turbidity of drainage. More specifically, the control unit 70 may determine the amount of removal of the permanent magnets 42 from the pipe 20.

If it is judged at the second judgment step S308 that there are margins for the bound matter concentration and turbidity of the drainage, the control unit 70 pulls the permanent magnets 42 out from the pipe 20 and re-releases the bound matter adsorbed to the permanent magnets 42 into the drainage (S309). Also, the control unit 70 discharges, out of the marine vessel, the drainage into which the bound matter is re-released (S310). If it is judged at the second judgment step S308 that there are no margins for the bound matter concentration and turbidity of the drainage, the control unit 70 does not re-release the bound matter into the drainage, but discharges only the drainage out of the marine vessel (S312).

If only drainage is to be discharged out of the marine vessel, the drainage from the scrubber apparatus 120 is expelled out of the marine vessel without transferring it through the transfer unit 10 such as the tank 60. In other words, the drainage is discharged out of the marine vessel without adding magnetic powders or the like.

With such a process, suspended solids such as black carbon contained in drainage from the scrubber apparatus 120 can be adsorbed efficiently. Also, the adsorbed solids can be released as appropriate.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

What is claimed is:

1. A drainage processing apparatus that processes drainage expelled from a scrubber apparatus, the drainage processing apparatus comprising:
   a magnetic powder adding unit that adds magnetic powders to the drainage;
   a transfer unit that transfers the drainage; and
   an adsorbing unit that is provided in the transfer unit, the adsorbing unit configured to:
      absorb bound matter that is contained in the drainage and contains at least a process-target substance and the magnetic powders,
      retain the bound matter in the transfer unit,
      re-release the adsorbed bound matter into the drainage in the transfer unit and expel the re-released absorbed bound matter to an outside;
   a measuring unit that measures a concentration of the bound matter contained in the drainage flowing in the transfer unit downstream of the adsorbing unit; and
   a control unit that, if the drainage containing the bound matter is expelled to an outside, causes the adsorbing unit to re-release the bound matter such that a concentration of the bound matter measured by the measuring unit is maintained in a tolerated range, wherein
   the transfer unit has a pipe that diverges at a point of divergence into:
      a first pipe that feeds the drainage back to be reused at the scrubber apparatus; and
      a second pipe that expels the drainage to the outside.

2. The drainage processing apparatus according to claim 1, wherein
   the magnetic powder adding unit feeds the magnetic powders into a tank in which the drainage expelled from the scrubber apparatus stays, and
   the adsorbing unit is provided to the transfer unit between the tank and the point of divergence.

3. The drainage processing apparatus according to claim 1, wherein
   the adsorbing unit has a permanent magnet provided to be directly insertable into and removable from within the transfer unit, and
   the permanent magnet adsorbs the bound matter by being inserted into the transfer unit, and re-releases the bound matter into the transfer unit by being removed from within the transfer unit.

4. The drainage processing apparatus according to claim 1, wherein
   the adsorbing unit has a permanent magnet,
   a tube wall of the transfer unit has a depression to and from which the permanent magnet is insertable and removable, and
   by the permanent magnet being inserted into the depression, an inner wall of the depression adsorbs the bound matter, and by the permanent magnet being removed from within the depression, the bound matter is re-released into the transfer unit.

5. The drainage processing apparatus according to claim 4, wherein the control unit controls an amount of the permanent magnet to be inserted into the depression, based on a result of measurement at the measuring unit.

6. The drainage processing apparatus according to claim 3, wherein the permanent magnet has a bar shape having a longer side, and is inserted such that a direction of the longer side becomes orthogonal to a direction of extension of the transfer unit.

7. The drainage processing apparatus according to claim 3, wherein
the adsorbing unit has:
a first permanent magnet; and
a second permanent magnet that is provided at a position different from the first permanent magnet in a direction of extension of the transfer unit and is provided to a tube wall opposite to the first permanent magnet.

8. The drainage processing apparatus according to claim 2, wherein
the adsorbing unit has:
a first permanent magnet provided to be directly insertable into and removable from within the transfer unit; and
a second permanent magnet provided upstream of the first permanent magnet in the transfer unit, and
a tube wall of the transfer unit has a depression to and from which the second permanent magnet is insertable and removable.

9. The drainage processing apparatus according to claim 3, wherein
the adsorbing unit has a plurality of permanent magnets, and
a density of permanent magnets upstream is lower than a density of permanent magnets downstream.

10. The drainage processing apparatus according to claim 3, wherein the permanent magnet has a bar shape having a longer side, and is inserted such that a direction of the longer side becomes parallel with a direction of extension of the transfer unit.

11. The drainage processing apparatus according to claim 10, wherein
the transfer unit has a large diameter part having a diameter larger than diameters of pipes on an upstream side and a downstream side,
the large diameter part includes side surfaces on which openings for the pipes on the upstream side and the downstream side are formed, and
the permanent magnet is provided to a side surface of the large diameter part.

12. The drainage processing apparatus according to claim 1, wherein if causing the adsorbing unit to re-release the bound matter, the control unit causes the bound matter to be re-released from the adsorbing unit sequentially, starting from a downstream side thereof.

13. The drainage processing apparatus according to claim 3, wherein an inner wall of the transfer unit is provided with a protruding part to scrape off the bound matter adsorbed to a surface of the permanent magnet, along with removal of the permanent magnet from the transfer unit.

14. The drainage processing apparatus according to claim 3, wherein an inner wall of the transfer unit is provided with a valve that blocks up an opening into which the permanent magnet has been inserted, along with removal of the permanent magnet from the transfer unit.

15. The drainage processing apparatus according to claim 1, wherein the adsorbing unit has a permanent magnet provided to be insertable into and removable from within the transfer unit, and
the permanent magnet adsorbs the bound matter by being inserted into the transfer unit, and re-releases the bound matter into the transfer unit by being removed from within the transfer unit.

16. A drainage processing apparatus that processes drainage expelled from a scrubber apparatus, the drainage processing apparatus comprising:
a magnetic powder adding unit that adds magnetic powders to the drainage;
a transfer unit that transfers the drainage; and
an adsorbing unit that is provided in the transfer unit, the adsorbing unit configured to:
absorb bound matter that is contained in the drainage and contains at least a process-target substance and the magnetic powders,
retain the bound matter in the transfer unit, and
re-release the adsorbed bound matter into the drainage in the transfer unit and expel the re-released absorbed bound matter to an outside;
a measuring unit that measures: a concentration of the bound matter contained in the drainage flowing in the transfer unit downstream of the adsorbing unit; or a flow rate of the drainage; and
a control unit that controls an amount of a permanent magnet to be inserted into the transfer unit, based on a result of measurement at the measuring unit; wherein
the transfer unit has a pipe that diverges at a point of divergence into:
a first pipe that feeds the drainage back to be reused at the scrubber apparatus; and
a second pipe that expels the drainage to the outside, wherein
the adsorbing unit has the permanent magnet provided to be insertable into and removable from within the transfer unit, and
the permanent magnet adsorbs the bound matter by being inserted into the transfer unit, and re-releases the bound matter into the transfer unit by being removed from within the transfer unit.

17. A drainage processing method of processing drainage expelled from a scrubber apparatus, the drainage processing method comprising:
adding magnetic powders to the drainage;
transferring, in a transfer unit, the drainage to which the magnetic powders are added, the transferring unit having a pipe that diverges at a point of divergence into a first pipe that feeds the drainage back to be reused at the scrubber apparatus and a second pipe that expels the drainage to an outside;
adsorbing, in an adsorbing unit provided in the transfer unit, bound matter formed by a process-target substance and the magnetic powders that are contained in the drainage to retain the bound matter in the transfer unit;
measuring a concentration of the bound matter contained in the drainage flowing in the transfer unit downstream of the adsorbing unit; and
re-releasing the bound matter adsorbed by the adsorbing unit into the drainage in the transfer unit to expel the re-released absorbed bound matter through the second pipe to the outside such that a concentration of the bound matter measured by the measuring is maintained in a tolerated range.

* * * * *